(No Model.) 2 Sheets—Sheet 1.
W. H. KAUFFMAN.
DUMPING WAGON.
No. 492,686. Patented Feb. 28, 1893.
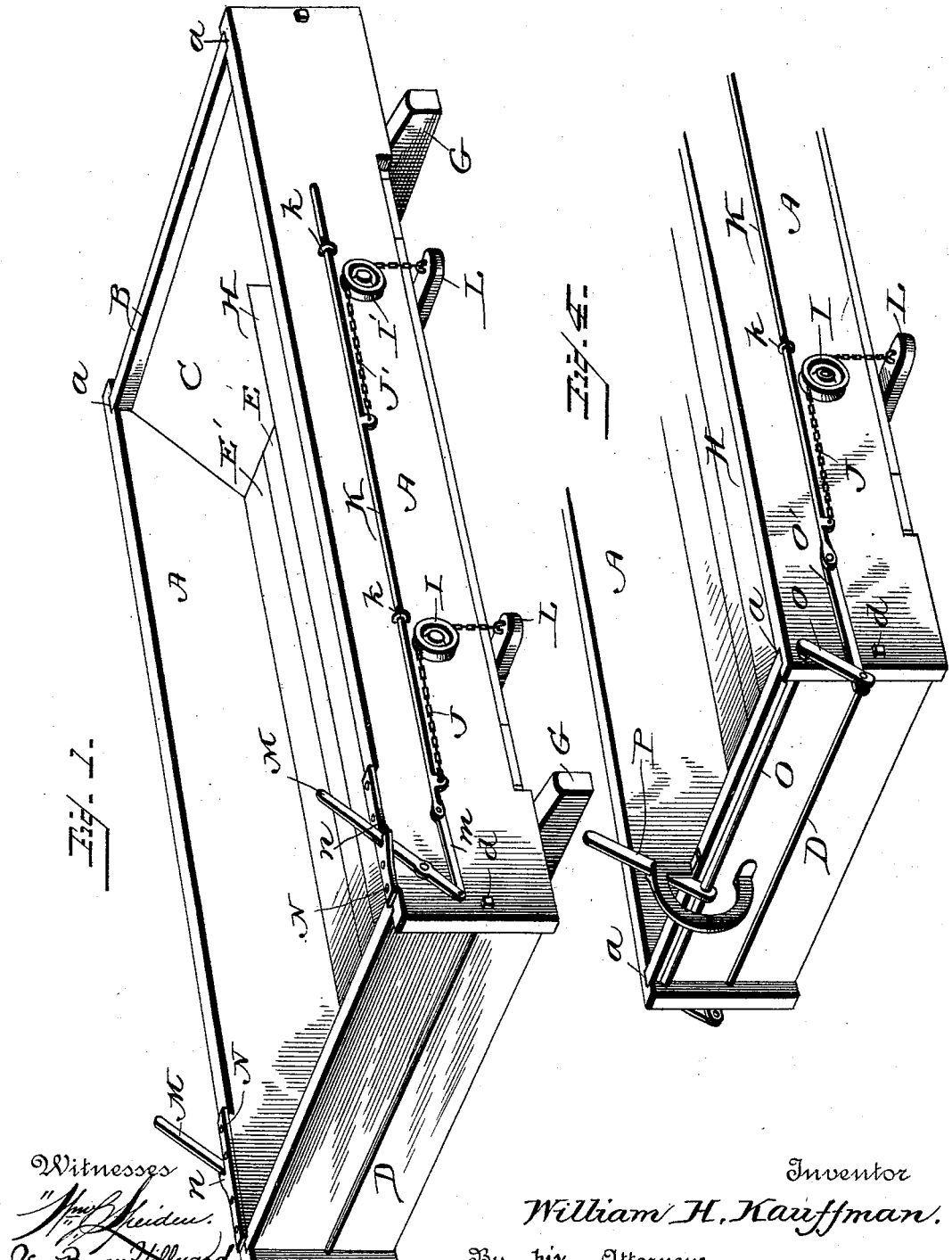
Witnesses
Inventor
William H. Kauffman.
By his Attorneys
THE NORRIS PETERS CO., PHOTO-LITHO., WASHINGTON, D. C.

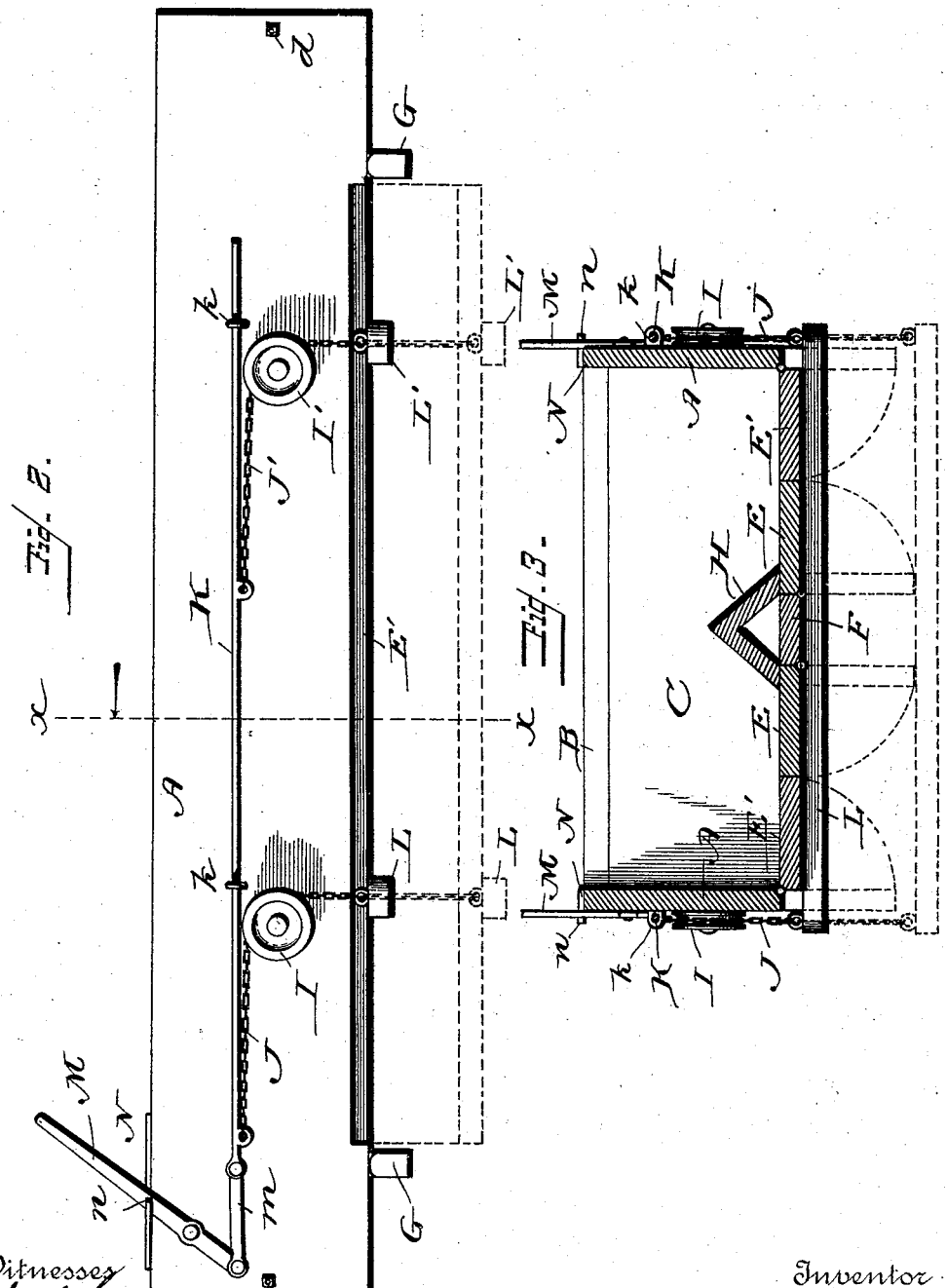

UNITED STATES PATENT OFFICE.

WILLIAM H. KAUFFMAN, OF COLUMBUS, OHIO.

DUMPING-WAGON.

SPECIFICATION forming part of Letters Patent No. 492,686, dated February 28, 1893.

Application filed May 19, 1892. Serial No. 433,607. (No model.)

*To all whom it may concern:*

Be it known that I, WILLIAM H. KAUFFMAN, a citizen of the United States, residing at Columbus, in the county of Franklin, State of Ohio, have invented certain new and useful Improvements in Dumping - Beds for Wagons; and I do hereby declare the following to be a full, clear, and exact description of the invention, such as will enable others skilled in the art to which it appertains to make and use the same.

My invention relates to dumping beds for wagons, and has for its object to provide a bed which is especially designed for four wheel vehicles, and which can be conveniently operated to dump a portion or the entire load at the will of the operator.

The improvement consists of the novel features and the peculiar construction and combination of the parts which will be hereinafter more fully described and claimed and which are shown in the annexed drawings, in which;

Figure 1 is a perspective view of the body portion of the wagon embodying my invention. Fig. 2 is a side elevation showing the operation of the invention by dotted lines. Fig. 3 is a cross section on the line X—X of Fig. 2 looking to the left. Fig. 4 is a modification showing a means for connecting the draw bars on opposite sides of the wagon body.

The wagon body may be any approved construction but is preferably composed of the side boards A having grooves or cleats $a$ in their opposing sides of each end, the end gates B fitted in the said grooves or cleats $a$, the inclined end portions C, and the tire rods D which have their ends threaded and thrust through openings in the side boards A and provided with burrs $d$ which are mounted on the threaded ends of the said tire rods B and serve as means to secure the side boards in their relative position and rapidly taken apart for shipment in knock down form by manufacturers.

The bottom or bed of the wagon body is composed of a series of slats or boards which are hinged or pivotally supported at one edge so as to drop down at the opposite edge and discharge the load which escapes through the bed or bottom of the wagon. In the preferable form of construction these slats or boards are arranged in pairs, each pair being arranged on opposite sides of a central line passing longitudinally through the bottom of the wagon. The inner slats E of each pair are hinged to a central beam F which is supported near its ends on the bolsters G, and the outer slats or boards are hinged to the side boards A. By means of this arrangement it will be seen that the slats or pairs will swing downward at their meeting or opposing edges. To prevent lodging of the dirt or other substance on the central beam F a double inclined housing H is placed over the same, the purpose being to deflect the earth grain, fertilizer, sand or other substance to either side of said beam F.

Each side of the wagon body will be similarly equipped and will be provided with grooved pulleys I and I' which are suitably attached to the side boards A and form guides for the chains J and J' which pass there over and are attached at their upper ends to a draw bar K which is adapted to slide in suitable keepers $k$. Cross bars L and L' extending from one side to the other of the wagon body are connected with the lower ends of the corresponding chains J and J', and are designed to support the slats E and E' in an elevated or closed position. A lever M is provided for each side of the wagon and is connected by link $m$ with the draw bar K to operate the same with keepers to effect a raising or lowering of the cross bars L and L' the plate N having shoulder or stop $n$ secured to the side of the wagon is adapted to engage with the lever M and hold the same so as to support the cross bars L and L', against the weight of the load.

From the foregoing description it will be observed that by releasing one of the levers M the corresponding draw bar K connected therewith will move so as to permit the ends of the cross bars L and L' connected with the said draw bar, to drop and the slats on this side of the wagon being no longer supported will turn down at their free edges and permit the partial dumping of the load. On releasing the opposite lever M the entire load will be dumped in a manner similar to that just described. In case it is desired to release both levers or actuate both draw bars simultaneously, so as to dump the load at one operation a rock bar O may be provided at front end of the wagon and have cranks o at its ends which are connected by links o' with the said draw bars K. This rock bar O may be operated in any suitable manner as by the lever P which may be conveniently located to be grasped by the operator.

Having thus described my invention, what I claim, and desire to secure by Letters Patent, is—

1. The combination with a wagon body having its bed composed of a series of slats or boards which are pivotally supported at one edge and adapted to swing downward at their outer edge, of cross bars located near the ends of said swinging slats or boards, pulleys on the sides of the wagon body above the ends of the said cross bars, draw bars mounted in keepers on each side of the wagon to guide them in their longitudinal movements, chains passing over the said pulleys and connected at their lower ends with the opposite ends of the said cross bars, and having their upper portions extending approximately parallel with the said draw bars with which they are connected, and means for actuating the said draw bars, substantially as and for the purpose set forth.

2. The combination with a wagon body having its bed composed of a series of slats or boards which are pivotally supported at one edge and adapted to swing downward at their outer edge, of cross bars located near the ends of said swinging slats or boards, pulleys on the sides of the wagon body above the ends of the said cross bars, draw bars mounted in keepers on each side of the wagon to guide them in their longitudinal movements, chains passing over the said pulleys and connected at their lower ends with the opposite ends of the said cross bars, and having their upper portions extending approximately parallel with the said draw bars with which they are connected, a rock bar journaled to the wagon body, cranks at the ends of the rock bar, links connecting the cranks with the draw bars and a lever for rocking the said bar in its bearings, substantially as described.

3. A dumping wagon body having inclined end portions, and having a central longitudinal beam, a double inclined housing placed over said central beam, slats or boards arranged in pairs on the opposite sides of the said beam and pivoted, respectively, to the said beam and the side boards of the wagon body, cross bars located near the ends of said pivoted slats or boards to support the same in a closed position, pulleys on the sides of the wagon body above the ends of the said cross bars, draw bars mounted in keepers on each side of the wagon to guide them in their longitudinal movements, chains passing over the said pulleys and connected at their lower ends with the opposite ends of the said cross bars, and having their upper portions extending approximately parallel with the said draw bars with which they are connected, and means for actuating the said draw bars, substantially as described for the purpose specified.

In testimony whereof I affix my signature in presence of two witnesses.

WILLIAM H. KAUFFMAN.

Witnesses:
MILTON JONES,
T. J. GILBERT.